US006266906B1

(12) United States Patent
Nagel

(10) Patent No.: US 6,266,906 B1
(45) Date of Patent: Jul. 31, 2001

(54) SPECIAL ITEM HOLDER FOR LABEL-HOLDING DATA STRIP

(75) Inventor: Thomas O. Nagel, Blairstown, NJ (US)

(73) Assignee: Trion Industries, Inc., Wilkes-Barre, PA (US)

( * ) Notice: Subject to any disclaimer, the term of this patent is extended or adjusted under 35 U.S.C. 154(b) by 0 days.

(21) Appl. No.: 09/587,695

(22) Filed: Jun. 5, 2000

(51) Int. Cl.[7] .............................. G09C 3/18
(52) U.S. Cl. .............................. 40/661.03; 40/649
(58) Field of Search .............................. 40/661.03, 642.01, 40/649

(56) References Cited

U.S. PATENT DOCUMENTS 5,197,215 * 3/1993 Torsleff .............................. 40/642
5,392,547 * 2/1995 Mason .............................. 40/642
5,456,034 10/1995 Lewis et al. .
6,026,603 * 2/2000 Kump et al. .............................. 40/661.03

* cited by examiner

*Primary Examiner*—C. Davis
(74) *Attorney, Agent, or Firm*—Schweitzer Cornman Gross & Bondell LLP

(57) ABSTRACT

An extruded plastic label strip for shelf front mounting. The strip is formed of relatively rigid but flexible plastic material and has a clear front panel joined at a bottom edge to the bottom edge of a back panel structure to form a continuous, upwardly opening label pocket. An overlay panel is joined integrally with an upper edge of the front panel and extends downward over the front thereof to form a downwardly opening continuous channel for receiving thin temporary information slips to flag special items. A narrow margin of soft plastic material is co-extruded to a rearwardly facing surface of the overlay panel in a region thereof forming a gripping throat. Primary pricing and information labels are inserted in the upwardly opening label pocket, while special slips, calling attention to special sales, new product items, etc., can be temporarily slipped under the overlay panel in a highly visible display orientation.

3 Claims, 3 Drawing Sheets

FIG. 1
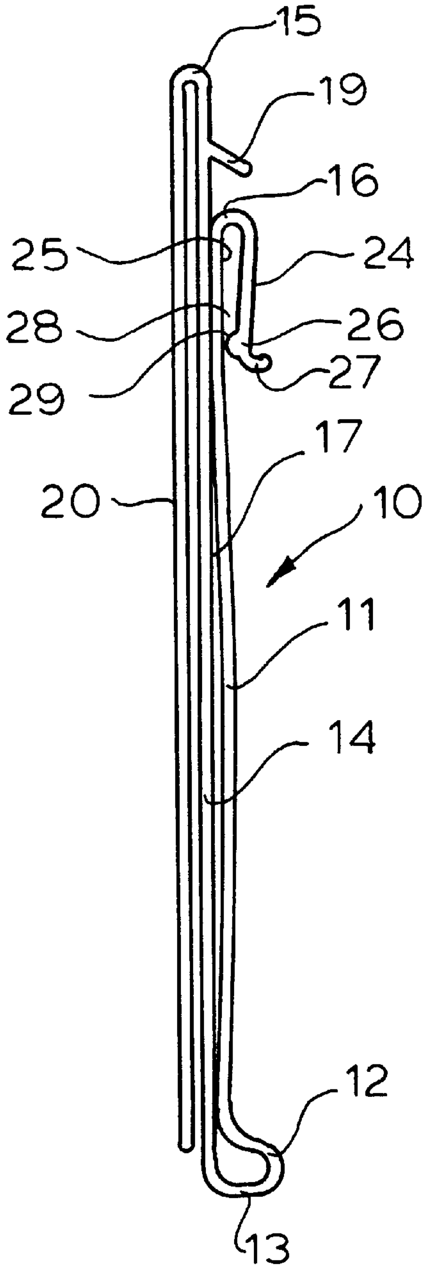
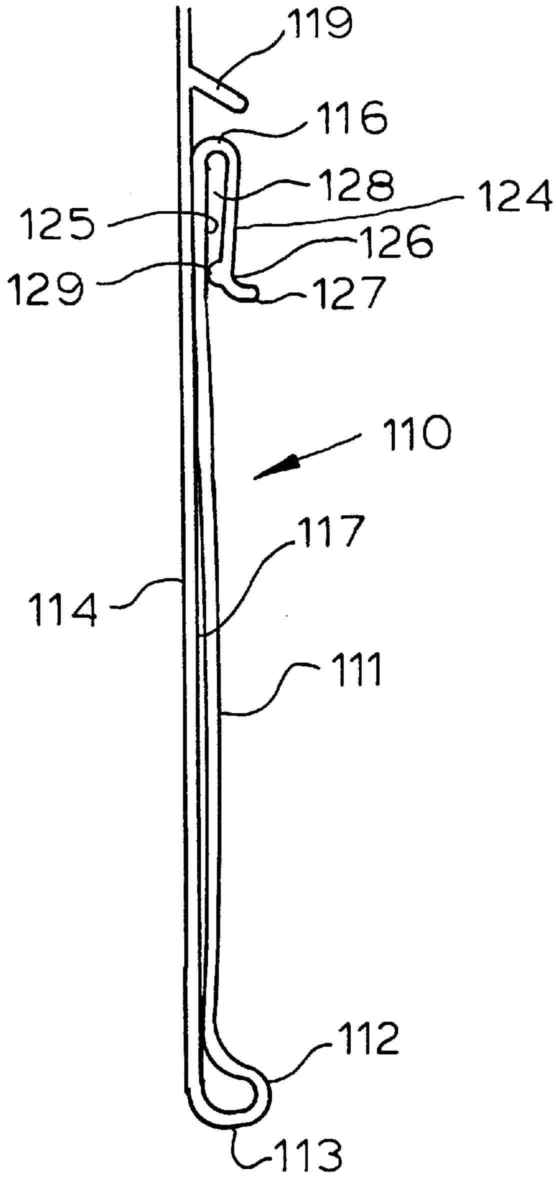
FIG. 3

SPECIAL ITEM HOLDER FOR LABEL-HOLDING DATA STRIP

BACKGROUND AND SUMMARY OF THE INVENTION

In many grocery chains, drug chains, discount department stores and the like, merchandise display shelves are provided along their front edges with ticket moldings or data strips for displaying pricing and other information related to the displayed merchandise. In many modern installations, plastic data strips are used in preference to extruded metal ticket moldings. In some instances, the plastic data strips are constructed to be mounted in existing metal ticket moldings, and in other cases, the data strips are mounted directly to the front edge of the shelving.

A typical form of plastic data strip is comprised of a continuous extruded section of plastic material having a clear plastic front panel joined along its bottom edge to a back panel structure. The back panel structure may comprise a single panel which is secured to the front edge of the shelving, or it may include an additional panel configured to be snapped into the front of a conventional metal ticket molding. In either case, the clear front panel and the back panel structure form a continuous, upwardly opening label-receiving pocket for receiving pricing and information labels, and the like.

It is a customary practice of stores of the type mentioned above to emphasize certain items in their displays, such as newly displayed items, items that are featured on special sale, etc. With conventional metal ticket moldings, these special tags typically are installed using plastic clips, which are inserted into the ticket molding, and provide a prominent display for the special tag. Where plastic data strips are utilized for the main pricing information, the special tags frequently are printed on thin, heat-bent plastic elements designed to be installed behind the clear front panel of the data strip. The special information can be printed on the plastic element, or the information may be printed on a paper tag which is enveloped within the special plastic element. The special plastic elements involve undesirable added expense. While in some cases they may be reused, they are usually thrown away after one or two uses. Moreover, the handling and storage of such reusable items is both an expense and an annoyance.

In accordance with the present invention, a plastic data strip is provided, along the upper edge of the front panel thereof, with a continuous, downwardly projecting overlay panel, joined integrally with the upper edge of the front panel, which forms a downwardly opening, tag-receiving pocket along the upper edge margin of the front panel. The overlay panel is configured to converge with the surface of the front panel to form a narrow throat, and thereafter to project forwardly to form a convergent entry.

The overlay panel enables a thin, inexpensive and disposable printed paper tag to be inserted anywhere along the length of the data strip, by inserting an upper edge portion of the paper tag underneath the overlay panel. When the special tag has served its purpose, it can simply be removed and discarded.

To advantage, the narrow throat formed by the overlay panel is provided with a narrow surface area of coextruded soft plastic material to facilitate gripping of the light paper tag, without unduly resisting insertion of the tag during installation.

For a more complete understanding of the above and other features and advantages of the invention, reference should be made to the following detailed description of preferred embodiments thereof and to the accompanying drawings.

DESCRIPTION OF THE DRAWINGS

FIG. 1 is a cross sectional view of a preferred embodiment of the improved data strip of the invention.

FIG. 3 is a cross sectional view of a second form of the data strip of the invention, adapted for direct mounting along the front edge of a display shelf.

DESCRIPTION OF PREFERRED EMBODIMENTS

Figure 2:
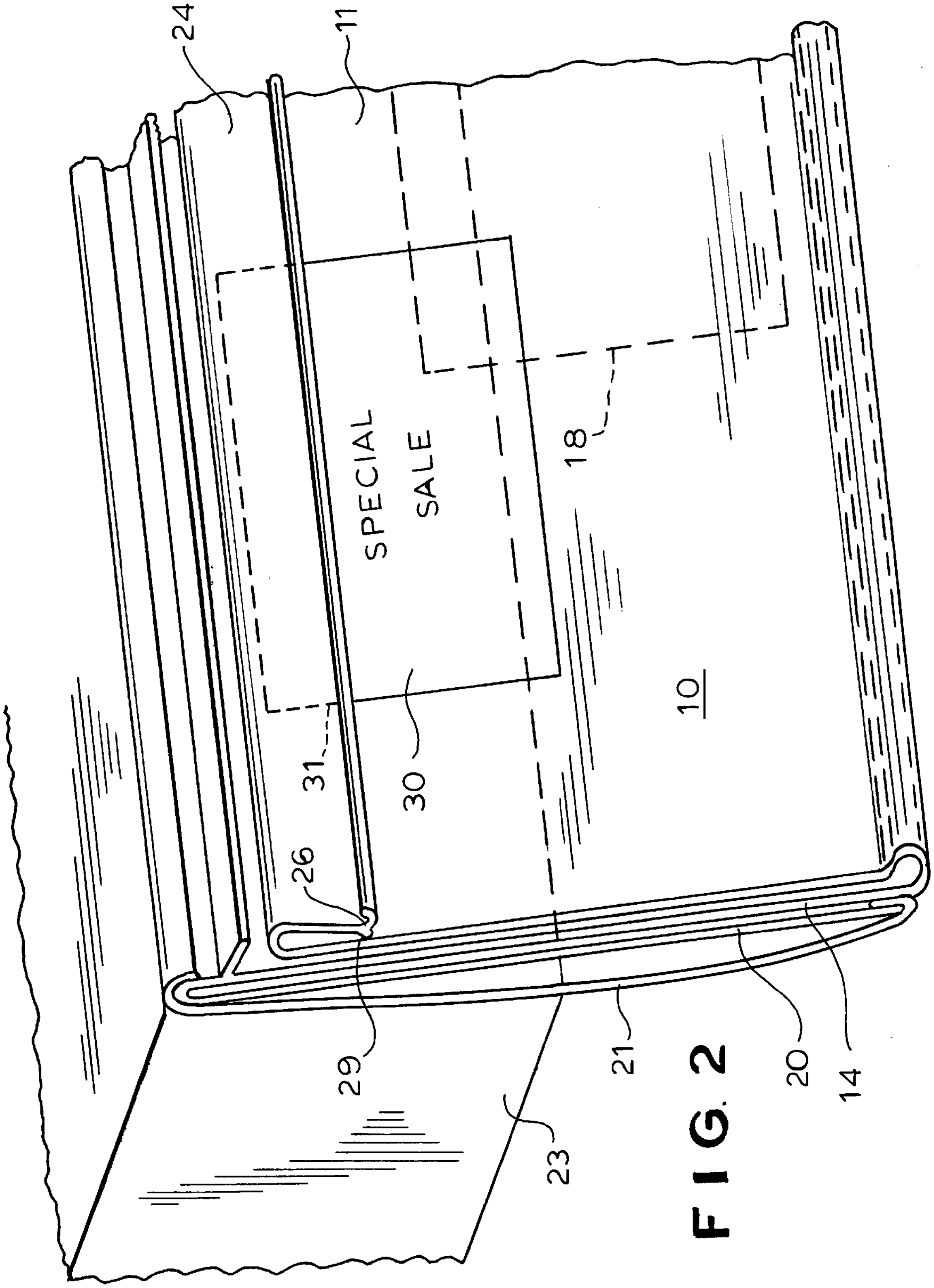
FIG. 2 is a fragmentary perspective view illustrating the data strip of FIG. 1 as mounted in a conventional ticket molding along the front edge of a display shelf.

Referring now to the drawing, and initially to FIGS. 1 and 2 thereof, the reference numeral 10 designates generally a continuous extruded section of plastic material forming a data strip. Although the strips are normally extruded in a continuous manner, typically they will be cut into sections of specific length, typically four feet, for application to standardized shelving used in chain stores and the like. The data strip 10 advantageously is extruded of a relatively rigid, but flexible, plastic material, such as rigid polyvinylchloride (PVC).

In the first illustrated form of the invention, the data strip includes a front panel 11, formed of clear, transparent plastic. A short forward projection 12 is formed at the bottom edge of the front panel, and the front panel joins at 13 with a first back panel 14 which extends upward, directly behind the front panel 11, preferably to an upper edge extremity 15, which is positioned somewhat above the upper edge extremity of the front panel.

The front panel 11 and the first back panel 14 define a continuous, upwardly opening channel 17 adapted for the reception of price tags and other information tags as shown at 18 in FIG. 2.

Typically, a short flange 19 projects forwardly and downwardly from the first back panel 14, above the upper edge of the front panel protecting the entrance to the label pocket 17.

In the form of the invention illustrated in FIGS. 1 and 2, a second back panel 20 is integrally joined with the first back panel 14 at the upper edge 15 of the latter, and extends downward behind the first back panel. The second back panel 20 provides means for mounting of the data strip in an existing ticket molding 21 (FIG. 2) mounted along the front edge of a display shelf 23. Many existing shelving installations already include such installed ticket moldings 21, and the arrangement of FIG. 1 provides a convenient way for converting the standard metal ticket molding to utilize the plastic data strip.

The first and second back panels 14, 20 typically are formed of the same type of material as the front panel 11, although it is not necessary that either of the back panels be of clear transparent material, and it may be desirable in many cases that the material of the back panels be opaque, or partially so.

In accordance with the invention, a short overlay panel 24 is joined integrally with the clear front panel 11, at its upper edge 16, and extends downwardly in front of the uppermost edge margin 25 of the front panel. The overlay panel converges toward the surface of the front panel and forms a narrow throat at 26. Below the throat 26, the panel is flared outwardly, as shown at 27, forming an upwardly convergent entrance to a pocket 28 formed between the overlay panel 24 and the front panel upper margin 25.

At the convergent throat 26, formed by the overlay panel, one of the confronting surfaces of the overlay panel 24 or front panel 11, preferably the overlay panel, is provided with a narrow surface area 29 which is coextruded of a softer material, preferably a softer, compatible PVC material. The geometry of the extrusion is such that the coextruded soft surface 29 lightly touches the opposing front surface of the front panel 11. The arrangement is such that a printed paper tag 30 (FIG. 2) can easily be slipped upward, underneath the coextruded surface 29, so that the upper margin 31 of the tag is within the pocket 28, and the tag is lightly gripped between the soft surface 29 and the confronting surface of the front panel. Since the overlay panel 24 extends continuously along the upper edge margin of the front panel, the special tag 30 (or a plurality thereof) can be inserted anywhere along the length of the data strip. The tags preferably can be printed on standard weight paper and discarded after use, minimizing initial expense and avoiding altogether the expense of handling reusable items. Since the special tags 30 are preferably printed on ordinary paper, they can easily be generated locally by the stores' own computers, to include suitable graphics, such as the store logo, etc. as well as the desired information.

Figure 4:
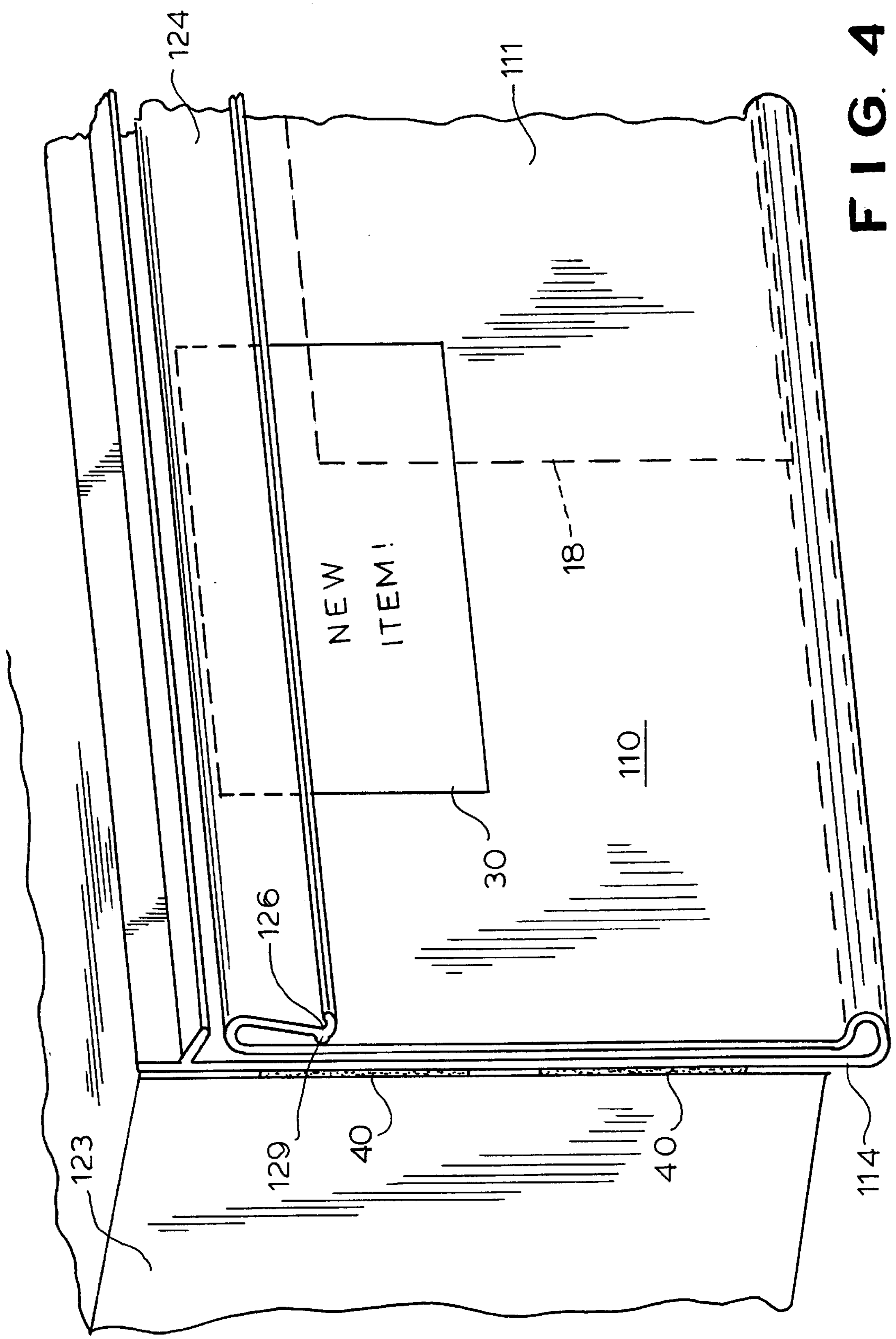
FIG. 4 is a fragmentary perspective illustration showing the data strip of FIG. 3, as mounted along the front edge of a display shelf.

The embodiment of FIGS. 3 and 4 is, in all important respects, similar to that of FIGS. 1 and 2 except that the back panel structure consists only of a single back panel 114 joined along its bottom edge to a front panel 111. The second back panel 20 of the FIG. 1 embodiment is eliminated, and the back panel 114 is secured to the front edge of a shelf 123 by means of adhesive strips 40 or the like.

The various elements of the embodiment of FIGS. 3 and 4 that are common with the embodiment of FIGS. 1 and 2 are identified by similar reference numerals, with the number 1 added at the front.

The improved data strip of the invention enables significant economies to be realized in connection with the posting of special tags in conjunction with the regular pricing information. The use of such special tags is an important part of the merchandising program in chain stores, and the arrangements heretofore provided have either involved extra expense and/or handling annoyances. The use of special clips and/or plastic holders requires special inventories and special handling, all of which is avoided by the device of the present invention. The new data strip enables the store to print up special paper tags locally at minimum cost, and the store employees can insert these quickly wherever they are desired. When they have served their purpose, they can simply be discarded.

It should be understood, of course, that the specific forms of the invention herein illustrated and described are intended to be representative only, as certain changes may be made therein without departing from the clear teachings of the disclosure. Accordingly, reference should be made to the following appended claims in determining the full scope of the invention.

I claim:

1. A label display strip for product display shelving, which comprises, (a) an elongated, one-piece extruded plastic display strip of uniform cross section, (b) said display strip including a back panel structure for mounting along a shelf front edge, and a clear front panel joined integrally with said back panel structure along bottom edges of each, (c) said clear front panel and said back panel structure being formed principally of relatively rigid plastic material and forming a continuous label receiving pocket, open at a top thereof, for receiving and displaying product information labels, (d) said display strip further including a continuously extruded tag holding overlay panel formed integrally and in one piece with said clear front panel at an upper edge thereof and extending downward in front of a narrow upper edge margin of said clear front panel, (e) said overlay panel being formed principally of a relatively rigid plastic material, (f) said overlay panel extending along the entire length of the display strip and forming with said narrow upper edge margin a downwardly opening pocket for the reception of an upper edge portion of an information tag, (g) a lower edge margin of said overlay panel forming a convergent entrance to said downwardly opening pocket and a narrow gripping throat at an upper end of said entrance, (h) said narrow gripping throat being formed with a co-extruded surface strip of relatively softer plastic material for temporarily frictionally gripping an upper edge portion of a display tag, the lower edge of said display tag being free of engagement by said label display strip.

2. A label display strip according to claim 1, wherein (a) said overlay strip includes an outwardly turned lower end edge manually engageable to enable local lifting of a portion of said overlay strip to facilitate entry of a thin, flimsy information slip.

3. A label display strip according to claim 1, wherein (a) said co-extruded surface strip is formed on said overlay panel and positioned for light contact with the front surface of said front panel.

* * * * *